April 26, 1960     J. M. BROOKE     2,934,408

PROCESS AND APPARATUS FOR ACETYLENE ANALYSIS

Filed April 3, 1958

INVENTOR.
J. M. BROOKE

BY Hudson & Young

ATTORNEYS united States Patent Office 2,934,408
Patented Apr. 26, 1960

2,934,408
PROCESS AND APPARATUS FOR ACETYLENE ANALYSIS

Jesse M. Brooke, Sweeny, Tex., assignor to Phillips Petroleum Company, a corporation of Delaware Application April 3, 1958, Serial No. 726,244

6 Claims. (Cl. 23—232)

This invention relates to the analysis of gaseous streams to determine the concentration of acetylene therein.

Large quantities of ethylene are being produced commercially at the present time for use in the production of polyethylene and as a raw material for several chemical products. This ethylene can advantageously be produced by the pyrolysis of a heavier hydrocarbon, which process generally results in the simultaneous production of acetylene. For many uses it is necessary that ethylene be employed which is substantially free of acetylene. It thus becomes desirable to have an analyzer which is capable of detecting small quantities of acetylene in ethylene in a rapid, accurate manner. There does not appear to be any such analyzer available at this time.

In accordance with the present invention, an analyzer is provided which is capable of detecting the presence of small quantities of acetylene in gaseous streams. This analyzer is based upon the known reaction of acetylene with silver nitrate to produce nitric acid:

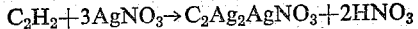

$$C_2H_2 + 3AgNO_3 \rightarrow C_2Ag_2 \cdot AgNO_3 + 2HNO_3$$

The present invention provides apparatus for passing a sample of the gas to be measured through a preselected volume of an aqueous solution of silver nitrate. This solution also contains a buffering agent which tends to prevent the pH of the solution from decreasing until a predetermined amount of nitric acid has been formed. The volume of gas required to overcome this buffering action is measured at the time the pH of the solution decreases to a predetermined value. The amount of gas required to reduce the pH is thus an inverse function of the concentration of acetylene therein. The apparatus of this invention is capable of being operated automatically to provide a number of analyses in sequence.

Accordingly, it is an object of this invention to provide novel apparatus for determining the concentration of acetylene in gaseous streams.

Another object is to provide a gas stream analyzer which is simple in construction, reliable in operation, and which is capable of being operated in an automatic manner.

A further object is to provide a method of determining the concentration of acetylene in a gaseous stream.

Other objects, advantages and features of the invention should become apparent from the following detailed description which is taken in conjunction with the accompanying drawing in which.

Figure 1:
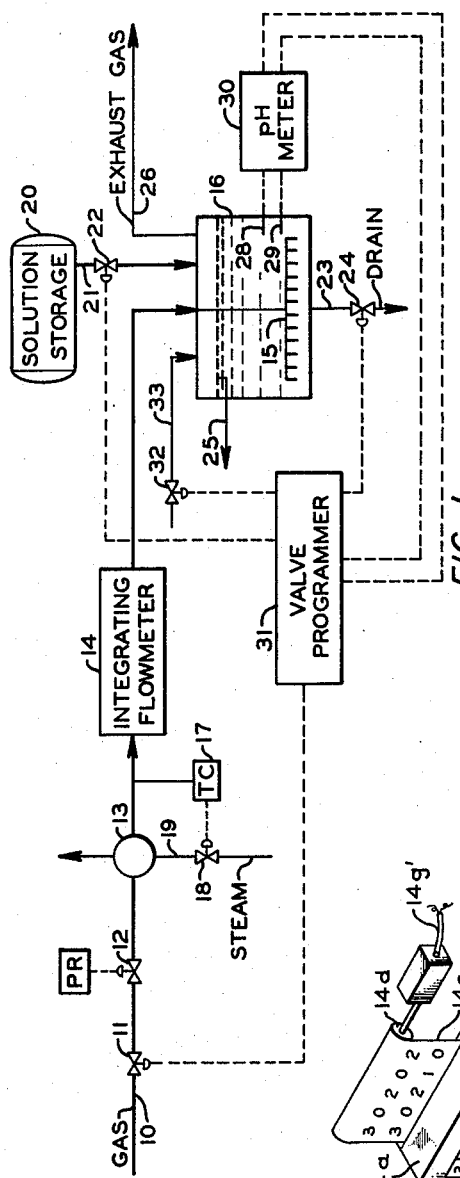
Figure 1 is a schematic representation of the acetylene analyzer of this invention.

Referring now to the drawing in detail and to Figure 1 in particular, a sample of the gas to be measured is introduced into the analyzer through a conduit 10. This conduit, which has a control valve 11, a pressure regulator 12, a heat exchanger 13, and an integrating flowmeter 14 therein, communicates with a diffuser ring 15 that is disposed within a vessel 16. Steam, or other heating medium, is circulated through exchanger 13 at a rate which is regulated by a temperature controller 17 that adjusts a valve 18 in steam conduit 19 to maintain the temperature of the gas stream to be analyzed constant.

Vessel 16 initially is filled with an aqueous solution of silver nitrate which has a buffering agent, such as ammonium acetate, contained therein. This solution is supplied to vessel 16 from a storage tank 20 through a conduit 21 which has a control valve 22 therein. Vessel 16 is provided with a drain conduit 23, which has a control valve 24 therein, and with an overflow drain 25 which maintains a predetermined volume of solution within the vessel. The gas from conduit 10 bubbles through the solution from diffuser ring 15 and is removed from vessel 16 through a vent conduit 26. Electrodes 28 and 29 extend into vessel 16 to provide a measurement of the pH of the solution therein. These electrodes are connected to a pH meter 30 which actuates a valve programmer 31. Programmer 31 provides signals which actuate valves 11, 22, 24 and a valve 32 in a conduit 33 which serves to admit flushing water into vessel 16.

Vessel 16 initially is filled with an aqueous solution of silver nitrate which contains the buffering agent. The resulting pH of this solution is of the order of seven or more. Valve 11 is then opened to admit the sample gas at a constant temperature and pressure into vessel 16 through flowmeter 14. Any acetylene present in this gas reacts with the silver nitrate in vessel 16 to produce nitric acid. The buffering agent tends to prevent the pH of the resulting solution from being lowered appreciably. However, after a predetermined amount of nitric acid has been formed, all of the buffering agent is expended so that the pH of the solution falls rapidly. The resulting output signal from pH meter 30 energizes valve programmer 31 so that valve 11 is closed to terminate the flow of acetylene containing gas into vessel 16. The reading of flowmeter 14 at this time is an inverse function of the acetylene concentration in the sample gas. If the concentration of acetylene is small, a large amount of gas is required to lower the pH of the solution in vessel 16. If the acetylene concentration is large, less gas is required to accomplish this result.

Valve programmer 31 also operates to prepare the analyzer for a subsequent analysis. Valve 24 is first opened to drain the solution from vessel 16, and is then closed. Valve 32 is then opened so that the vessel is filled with water, and is then closed. Valve 24 is again opened so that vessel 16 is drained, thereby providing a rinsing action. Valve 24 is then closed, and valve 22 is opened so that additional solution flows into vessel 16. At the end of this sequence of events, valve 11 is again opened and a second analysis is made.

Figure 2:
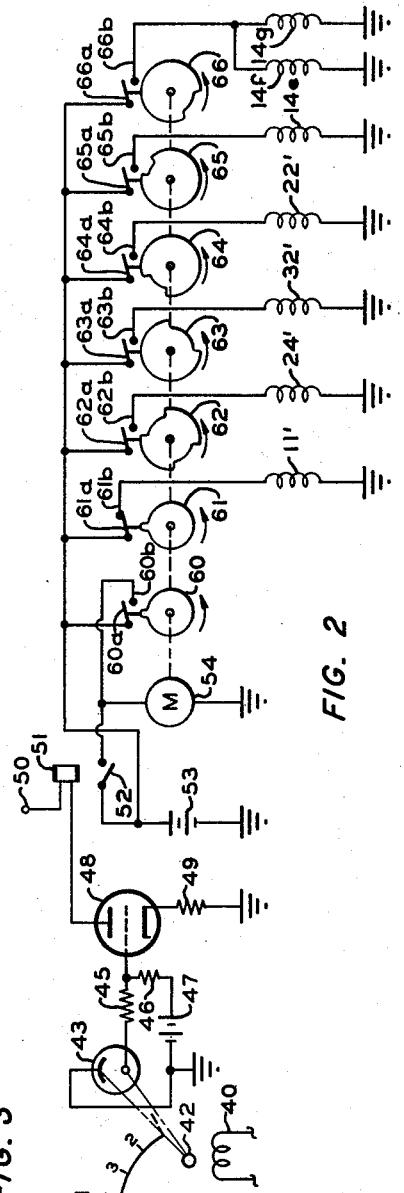
Figure 2 is a schematic circuit drawing of the valve programmer of the analyzer of Figure 1.

Valve programmer 31 is illustrated in Figure 2. Meter 30, which can be a conventional pH meter, such as described in Bulletin 260-A, Beckman Instruments, Inc., South Pasadena, California, provides an electrical signal which energizes a coil 40 to deflect a pointer 41 by an amount representative of the pH of this solution in vessel 16. A light source 42 is mounted adjacent pointer 41 so as to illuminate a photoelectric cell 43. The end of pointer 41 carries a vane 44 which interrupts the light beam when the pH of the solution falls to a predetermined value, such as approximately 2.

The anode of cell 43 is connected through resistors 45 and 46 to the positive terminal of a voltage source 47. The cathode of photoelectric cell 43 and the negative terminal of voltage source 47 are connected to ground. The junction between resistors 45 and 46 is connected to the control grid of a triode 48. The cathode of triode 48 is connected to ground through a resistor 49, and the anode of triode 48 is connected to a positive potential terminal 50 through a relay coil 51.

Triode 48 is biased so that it does not conduct when photoelectric cell 43 is illuminated from light source 42. Once the light beam is interrupted by vane 44, conduction by photoelectric cell 43 is terminated so that the potential applied to the control grid of triode 48 is increased. This results in triode 48 conducting to energize relay coil 51 to close switch 52. Switch 52 is connected between the first terminal of a voltage source 53 and the first terminal of a timing motor 54. The second terminals of voltage source 53 and motor 54 are connected to ground so that closure of switch 52 results in motor 54 being energized.

The drive shaft of timing motor 54 carries a series of cams 60, 61, 62, 63, 64, 65 and 66 which actuate respective switches 60a, 61a, 62a, 63a, 64a, 65a and 66a. These switches are all connected to the first terminal of voltage source 53. Cam 60 is designed so that switch 60a engages a terminal 60b shortly after motor 54 is energized. Terminal 60b is connected to the first terminal of motor 54 so that motor 54 remains energized during one revolution of cam 60, even though vane 44 should be moved out of the path of the light beam to photoelectric cell 43. This provides a locking network to insure that one cycle of the valve programmer is completed.

Cam 61 is designed so that switch 61a is in engagement with a terminal 61b at the start of the timing cycle. Terminal 61b is connected to ground through a solenoid 11' which controls valve 11 of Figure 1. Valve 11 is open when solenoid 11' is energized. As soon as motor 54 is energized, switch 61a is moved out of engagement with terminal 61b so that solenoid 11' is deenergized to close valve 11. Valve 11 remains closed during the remainder of the timing cycle. This prevents gas from flowing into vessel 16 at the time the vessel is being flushed and refilled. It also prevents additional gas flow from being recorded by flowmeter 14.

Cams 62, 63 and 64 control the flushing and refilling of vessel 16. Switches 62a, 63a and 64a engage respective terminals 62b, 63b and 64b during parts of the timing cycle. These terminals are connected to ground through respective solenoids 24', 32' and 22' which control respective valves 24, 32 and 22 of Figure 2. The valves are opened when the associated solenoids are energized. Valve 24 is opened first to permit the solution in vessel 16 to be drained. Valve 24 is then closed and valve 32 is opened so that vessel 16 is filled with rinse water. Valve 32 is then closed. Valve 24 is then opened to drain the rinse water. Valve 24 is once again closed and valve 22 is opened to fill vessel 16 with additional solution. Valve 22 is opened a sufficient length of time for the solution to fill vessel 16 up to the level of overflow drain 25. This insures that a constant volume of solution is contained within the vessel.

Figure 3:
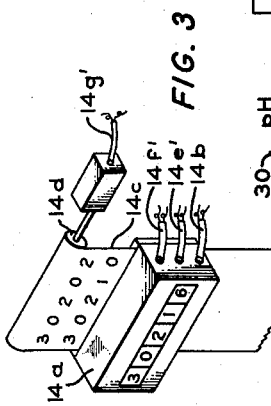
Figure 3 illustrates recording mechanism in the integrating flowmeter of Figure 1.

Integrating flowmeter 14 can advantageously be of the type described in Catalog Section 50–A, Fischer & Porter Co., Hatboro, Pa. This flowmeter provides a series of electrical pulses which actuate an electrical counter, such as 14a in Figure 3. The actuating pulses are applied to counter 14a by conductors 14b. A strip of paper 14c is mounted on a roller 14d so as to be moved past counter 14a. Counter 14a is provided with a solenoid 14e, see Figure 3, which moves the indicator wheels of the counter into engagement with paper 14c when the solenoid is energized by conductors 14e'. Cam 65 moves switch 65a into engagement with terminal 65b at the beginning of the timing cycle. This results in solenoid 14e being energized to provide a printed record of the flow through flowmeter 14.

Counter 14a is also provided with a reset solenoid 14f, see Figure 2, which moves the indicating dials back to zero when the solenoid is energized by conductors 14f'. Roller 14d is actuated by a mechanism which includes a ratchet operated solenoid 14g, see Fig. 2, that moves paper 14c relative to counter 14a. Solenoids 14f and 14g are energized when cam 66 moves switch 66a into engagement with terminal 66b. This prepares the counter for a subsequent analysis.

As a specific example of the operation of the analyzer of this invention, the solution in tank 20 is prepared by combining 4.1 grams of silver nitrate with 7.7 grams of ammonium acetate and adding distilled water to make 1000 ml. of solution. The pH of this solution is lowered to 2.0 when 1.008 grams of nitric acid has been produced by acetylene in the test gas. If the test gas is bubbled through 1000 ml. of the solution at a rate of 600 cc. per minute and one hour is required to lower the pH to 2, the indicated concentration of acetylene in the test gas is 0.5 volume percent. This is calculated from the indicated flow of 35,800 cc. of test gas, the gas being at substantially atmospheric pressure and at a temperature of 100° F.

It should be evident that flowmeter 14 can read directly the volume of gas therethrough, from which reading the acetylene concentration can readily be calculated. If desired, the flowmeter can be calibrated to read acetylene concentration directly. As an alternative, flowmeter 14 can be replaced by a flow controller to maintain a constant flow rate of gas. The time required to drop the pH is then an indication of the acetylene concentration.

In some operations it may be desirable to add small amounts of conventional antiform agents to the reagent solution to prevent foaming in vessel 16.

While the invention has been described in conjunction with a present preferred embodiment, it should be evident it is not limited thereto.

What is claimed is:

1. Gas analysis apparatus comprising a vessel adapted to contain a test fluid, conduit means communicating at one end with the interior of said vessel to introduce gas to be analyzed into said vessel, pressure regulating means associated with said conduit means to maintain a predetermined pressure therein, temperature regulating means associated with said conduit means to maintain a predetermined temperature therein, flow measuring means associated with said conduit means to measure the flow of gas therethrough, means to detect a change in the test fluid within said vessel when contacted with a predetermined volume of the gas to be analyzed, and means responsive to said means to detect to terminate the flow of gas through said conduit means.

2. Gas analysis apparatus comprising a vessel adapted to contain a test fluid, conduit means communicating at one end with the interior of said vessel to introduce gas to be analyzed into said vessel, flow measuring means associated with said conduit means to measure the flow of gas therethrough, means to detect a change in the test fluid within said vessel when contacted with a predetermined volume of the gas to be analyzed, means responsive to said means to detect to terminate the flow of gas through said conduit means, a storage tank adapted to contain said test fluid, and means responsive to said means to detect to drain said vessel, thereafter to fill said vessel from said tank, and thereafter to pass gas to be analyzed again through said conduit means.

3. The apparatus of claim 2 further comprising means to fill said vessel with a cleansing fluid and to discharge same after said vessel has been drained but before said vessel is filled from said storage tank.

4. The method of measuring the concentration of acetylene in a gaseous mixture which comprises positioning an aqueous solution of silver nitrate containing a buffering agent in a contacting zone, and passing the gaseous fluid to be measured into said zone until the pH of the solution falls to a predetermined value, whereby the acetylene concentration in the gaseous fluid to be measured can be determined from the volume of gaseous fluid required to lower the pH of the solution to said predetermined value.

5. The method of claim 4 wherein said buffering agent is ammonium acetate.

6. The method of measuring the concentration of acetylene in a gaseous mixture which comprises positioning an aqueous solution of silver nitrate containing a buffering agent in a contacting zone, passing the gaseous fluid to be measured into said zone until the pH of the solution falls to a predetermined value, and measuring the volume of gaseous fluid passed into said zone, said volume being representative of the acetylene concentration in the gaseous fluid to be measured.

References Cited in the file of this patent

UNITED STATES PATENTS

| | | |
|---|---|---|
| 1,560,660 | Cain | Nov. 10, 1925 |
| 2,607,718 | Suthard | Aug. 19, 1952 |
| 2,772,779 | Norris | Dec. 4, 1956 |

OTHER REFERENCES

Altieri: Gas Analysis and Testing of Gaseous Materials, pp. 330–32, American Gas Assoc., New York, 1945.